United States Patent
Han et al.

(10) Patent No.: US 11,113,116 B2
(45) Date of Patent: Sep. 7, 2021

(54) TASK MAPPING METHOD OF NETWORK-ON-CHIP SEMICONDUCTOR DEVICE

(71) Applicants: SK hynix Inc., Gyeonggi-do (KR); RESEARCH & BUSINESS FOUNDATION SUNGKYUNKWAN UNIVERSITY, Gyeonggi-do (KR)

(72) Inventors: Tae Hee Han, Seoul (KR); Hyun Joong Kim, Gyeonggi-do (KR)

(73) Assignees: SK hynix Inc., Gyeonggi-do (KR); RESEARCH & BUSINESS FOUNDATION SUNGKYUNKWAN UNIVERSITY, Gyeonggi-do (KR)

( * ) Notice: Subject to any disclaimer, the term of this patent is extended or adjusted under 35 U.S.C. 154(b) by 143 days.

(21) Appl. No.: 16/674,914

(22) Filed: Nov. 5, 2019

(65) Prior Publication Data
US 2020/0125415 A1    Apr. 23, 2020

Related U.S. Application Data

(62) Division of application No. 14/831,382, filed on Aug. 20, 2015, now Pat. No. 10,503,559.

(30) Foreign Application Priority Data

Apr. 9, 2015  (KR) .......................... 10-2015-0050383

(51) Int. Cl.
*G06F 9/50* (2006.01)

(52) U.S. Cl.
CPC ............ *G06F 9/5066* (2013.01); *Y02D 10/00* (2018.01)

(58) Field of Classification Search
CPC ............................ G06F 9/5066; Y02D 10/00
See application file for complete search history.

(56) References Cited

U.S. PATENT DOCUMENTS

| 8,787,379 | B2 * | 7/2014 | Ramanujam | H04L 45/122 370/392 |
|---|---|---|---|---|
| 2007/0266223 | A1 * | 11/2007 | Nguyen | G06F 9/38 712/25 |
| 2011/0173622 | A1 * | 7/2011 | Shin | G06F 9/4856 718/102 |
| 2015/0106821 | A1 * | 4/2015 | Chang | G06F 9/5061 718/104 |
| 2015/0358393 | A1 * | 12/2015 | Pande | H04L 45/122 709/201 |
| 2016/0006471 | A1 * | 1/2016 | Pande | H04W 76/10 455/500 |
| 2016/0070603 | A1 * | 3/2016 | Lu | G06F 9/5088 718/104 |

(Continued)

OTHER PUBLICATIONS

Maqsood et al. "Dynamic task mapping for Network-on-Chip based systems." Journal of Systems Architecture, vol. 61, Issue 7, Aug. 2015. (Year: 2015).*

*Primary Examiner* — Benjamin C Wu
(74) *Attorney, Agent, or Firm* — IP & T Group LLP

(57) ABSTRACT

A task mapping method of a NoC semiconductor device includes assigning a first task of a plurality of tasks for node control of the NoC semiconductor device to a first node of a first chip; computing tag values of second tasks of the plurality of tasks which are not assigned to the first node; and assigning the second tasks to a second node according to the tag values.

5 Claims, 9 Drawing Sheets

(56) References Cited

U.S. PATENT DOCUMENTS

2016/0182393 A1* 6/2016 Chen ................. H04L 47/72
                                                    370/412
2016/0269321 A1* 9/2016 Lee .................. H04L 41/145
2017/0046198 A1* 2/2017 Solihin ............... G06F 9/505
2018/0095751 A1* 4/2018 Aminot ............. G06F 9/30101

* cited by examiner

TASK MAPPING METHOD OF NETWORK-ON-CHIP SEMICONDUCTOR DEVICE

CROSS-REFERENCE TO RELATED APPLICATIONS

This application is a division of U.S. patent application Ser. No. 14/831,382 filed on Aug. 20, 2015, which claims priority of Korean Patent Application No. 10-2015-0050383, filed on Apr. 9, 2015. The disclosure of each of the foregoing applications is incorporated herein by reference in its entirety.

BACKGROUND

1. Field

Exemplary embodiments relate to a semiconductor device, and more particularly, to a task mapping method of a network-on-chip (NoC) semiconductor device.

2. Description of the Related Art

Communication and information technology (IT) has rapidly developed. In the IT field, the improvement in integration and performance of system-on-chip (SoC) devices has become an important issue. In particular, CMOS image sensors (CIS) and image signal processors (ISP), which are capable of processing ultra high definition (UHD: 4K and 8K) in the image multimedia field, require high functionality, high resolution, and high performance, and therefore data traffic has rapidly increased. Examples of SoC devices include network-on-chip (NoC) semiconductor devices that are capable of increasing communication efficiency by using through-silicon-vias (TSV). However, NoC semiconductor devices generate a lot of heat due to high power consumption.

In order to solve the heat generation problem, a cooling device has been developed in consideration of thermal design power (TDP) specifications.

U.S. Pat. No. 8,743,703 discloses a heat control method that uses throttling, but does not disclose a solution for efficiently performing heat control of the NoC semiconductor device.

SUMMARY

Exemplary embodiments are directed to a task mapping method capable of efficiently handling heat generated from a NoC semiconductor device.

In an embodiment, a task mapping method of a NoC semiconductor device may include assigning a first task of a plurality of tasks for node control of the NoC semiconductor device to a first node of a first chip; computing tag values of a second task of the plurality of tasks which are not assigned to the first node; and assigning the second tasks to a second node according to the tag values.

In another embodiment, there is provided a task mapping method of a NoC semiconductor device, which migrates a task of a first node and may include checking second nodes to which no tasks are assigned; computing the number of hops from the first node to the second nodes; setting candidate nodes to which the task can be migrated, among the second nodes; analyzing performance overheads of the candidate nodes in ascending order with respect to the number of hops; selecting a target node having the smallest performance overhead according to the analysis result; and migrating the task to the target node.

DETAILED DESCRIPTION

Exemplary embodiments will be described below in more detail with reference to the accompanying drawings. The disclosure may, however, be embodied in different forms and should not be construed as limited to the embodiments set forth herein.

Moreover, detailed descriptions related to well-known functions or configurations will be left out to not unnecessarily obscure the subject matter of the present invention.

Although the terms first and second are used herein to describe various elements, these elements should not be limited by these terms, and are used only for distinguishing one element from another element.

Figure 1:
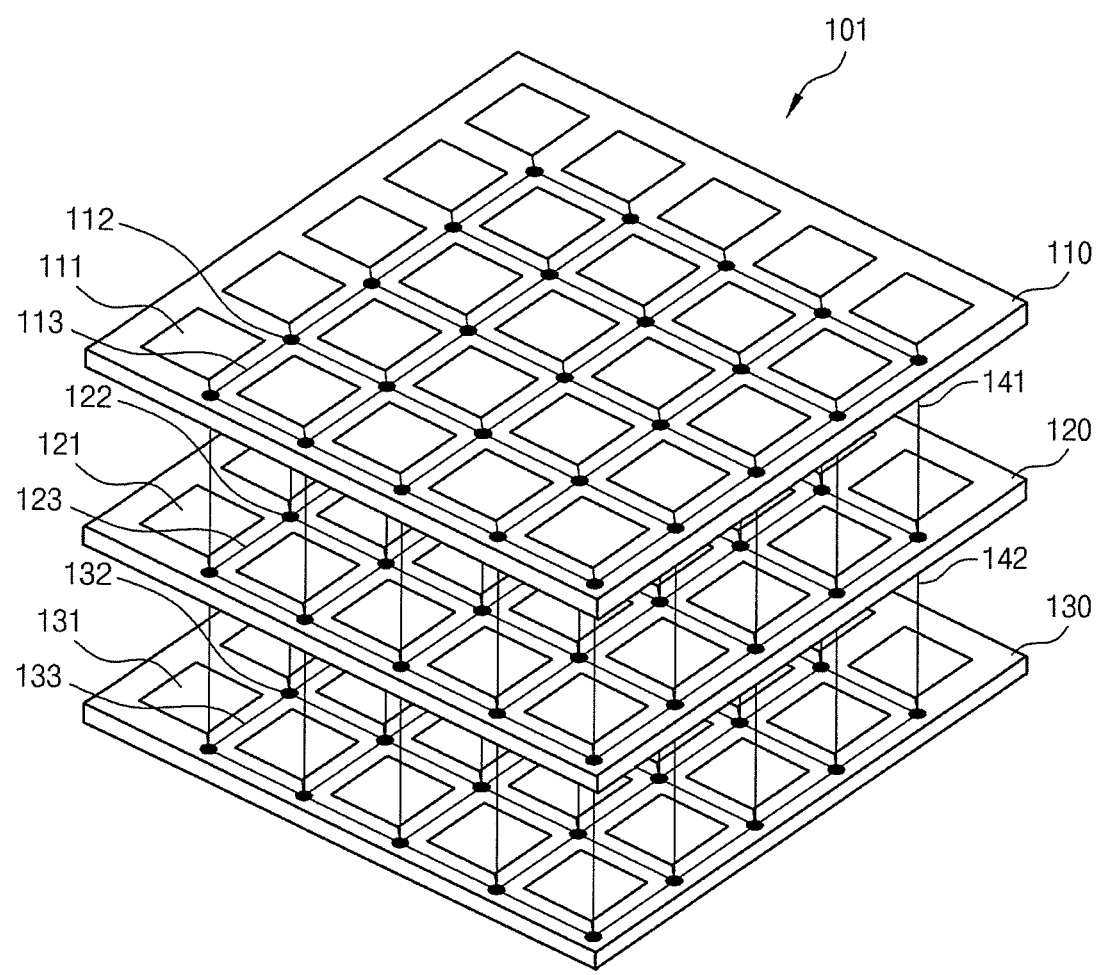
FIG. 1 is a schematic perspective view of a NoC semiconductor device.
Figure 2:
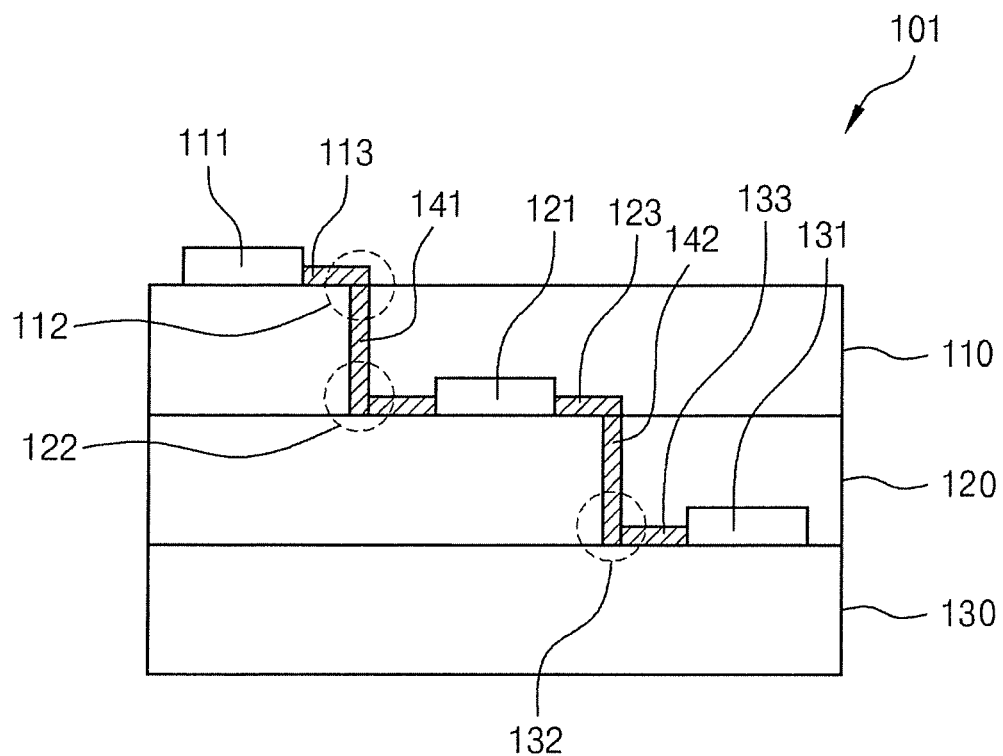
FIG. 2 is a side cross-sectional view of a NoC semiconductor device illustrated in FIG. 1.

FIG. 1 is a schematic perspective view of a NoC semiconductor device 101. FIG. 2 is a side cross-sectional view of the NoC semiconductor device 101 illustrated in FIG. 1. The structure of the NoC semiconductor device 101 will be described with reference to FIGS. 1 and 2.

Referring to FIG. 1, the NoC semiconductor device 101 may have a stacked structure of a plurality of semiconductor chips, for example, three chips 110 to 130. The three semiconductor chips 110 to 130 are electrically coupled to each other through TSVs 113 and 123. That is, through TSVs 141 and 142 formed in the uppermost semiconductor chip 110 and the intermediate semiconductor chip 120, the uppermost semiconductor chip 110 may perform data communication with the intermediate semiconductor chip 120 and the lowermost semiconductor chip 130.

Each of the three semiconductor chips 110, 120, and 130 may include a plurality of semiconductor elements or cores 111, 121, and 131, and a plurality of nodes 112, 122, and 132. Each of the nodes 112, 122, and 132 may include a switching element (not illustrated) for controlling data transmission. Each of the semiconductor elements 111, 121, and 131 may include various units for specific functions. For example, each of the semiconductor elements 111, 121, and 131 may include one or more of a controller, a memory, and a signal processor. The switching element may include a transmission gate, a logic gate, and an inverter, each of which is configured with a metal oxide semiconductor (MOS) transistor or a bipolar transistor. In addition, the switching element may include another element for a specific function. Each of the nodes 112, 122, and 132 may be electrically coupled to the plurality of semiconductor elements 111, 121, and 131. Therefore, one semiconductor element may perform data communication with another semiconductor element through one or more nodes. That is, the semiconductor elements 111, 121, and 131 and the nodes 112, 122, and 132 form a network to perform data communication.

On one of the top and bottom surfaces of each semiconductor chip, the plurality of semiconductor elements 111, 121, or 131 and the plurality of nodes 112, 122, or 132 may be formed. On both of the top and bottom surfaces, the semiconductor elements 111, 121, or 131 and the nodes 112, 122, or 132 may be formed. Such a selection may be made when the semiconductor device 101 is designed.

Each of the plurality of nodes 112, 122, and 132 may serve as one or more of a two-dimensional (2D) node and three-dimensional (3D) node.

The 2D node may be used for horizontal communication. That is, the 2D node may provide a communication path through which semiconductor elements of a single semiconductor chip can perform data communication.

The 3D node may be used for vertical communication. That is, the 3D node may provide a communication path through which semiconductor elements of vertically stacked semiconductor chips can perform data communication with other semiconductor chips.

When semiconductor elements and switching elements are formed only on the bottom surface of the uppermost semiconductor chip 110 and the top surface of the lowermost semiconductor chip 130, the uppermost semiconductor chip 110 and the lowermost semiconductor chip 130 may not need to have the TSV structure.

As such, the semiconductor elements 111, 121, and 131 of vertically stacked semiconductor chips 110, 120, and 130 may perform horizontal and vertical data communication through the plurality of nodes 112, 122, and 132.

FIG. 1 illustrates three semiconductor chips 110, 120, and 130 that are stacked in the NoC semiconductor device 101. However, this is only an example and two or four or more semiconductor chips may be stacked.

Referring to FIG. 2, the semiconductor chips 110, 120, and 130 may include a plurality of semiconductor elements 111, 121, and 131 and a plurality of via lines 141 and 142.

The via lines 141 and 142 may provide a communication path through which the semiconductor elements 111, 121, and 131 can vertically perform data communication.

The via lines 141 and 142 may be electrically coupled to the semiconductor elements 111, 121, and 131 through wires 113, 123, and 133 formed in the respective semiconductor chips 110, 120, and 130.

As such, one semiconductor element may perform horizontal and vertical data communication with the other semiconductor elements through the via lines 141 and 142 and the wires 113, 123, and 133.

Figure 3:
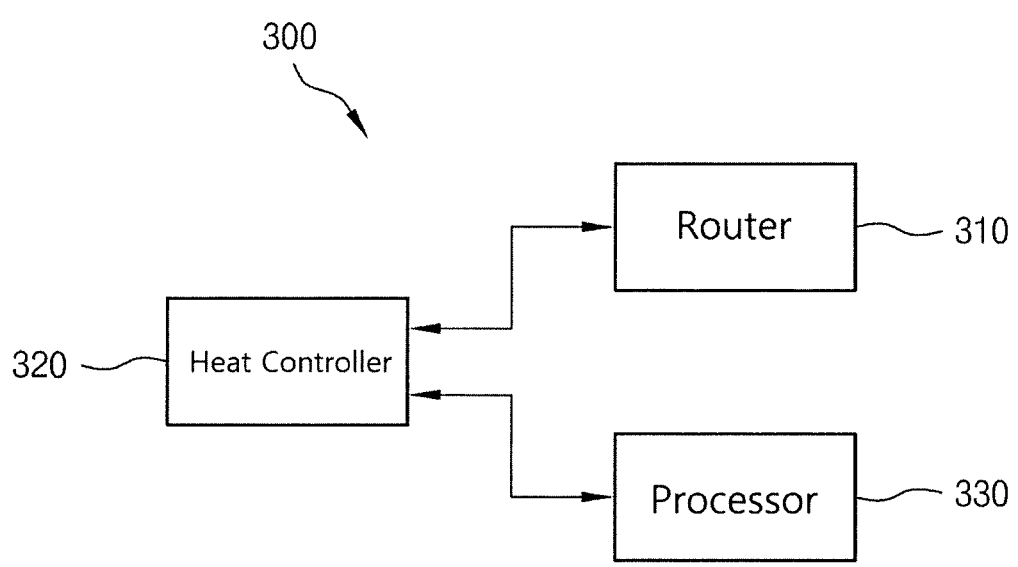
FIG. 3 is a block diagram of a node control device provided in any one of the nodes illustrated in FIG. 1.

FIG. 3 is a block diagram of a node control device 300 provided in any one of the nodes 112, 122, and 132 illustrated in FIG. 1. Referring to FIG. 3, the node control device 300 may include a router 310, a processor 330, and a heat controller 320.

The router 310 may share information of internet protocols (IPs) of adjacent node control devices, and detect a target node by examining connected nodes.

The processor 330 may include a temperature sensor (not illustrated). The temperature sensor may detect the temperature of a corresponding node. The processor 330 may transmit the detected temperature to the heat controller 320.

The heat controller 320 may be connected to the router 310 and the processor 330. The heat controller 320 may manage the temperature of the corresponding node, and control communication path setting and connection between the corresponding node and the target node according to the temperature of the node.

The heat controller 320 may check the temperature of the corresponding node by analyzing a signal received from the processor 330, and control the heat of the node according to the temperature. When the temperature of the node reaches a critical temperature and thus a heat problem such as a hot spot occurs in the node, the heat controller 320 may set the node to an abnormal node of a thermal risk state. The abnormal node of the thermal risk state may be isolated from the other nodes and may not serve as a communication node.

As such, the heat controller 320 may rapidly check the temperature of a node using the temperature sensor. When a heat problem such as a hot spot occurs in the node, the heat controller 320 may perform thermal management for the node by limiting the use of the node. Therefore, the thermal risk state of the node can be immediately controlled.

Figure 4:
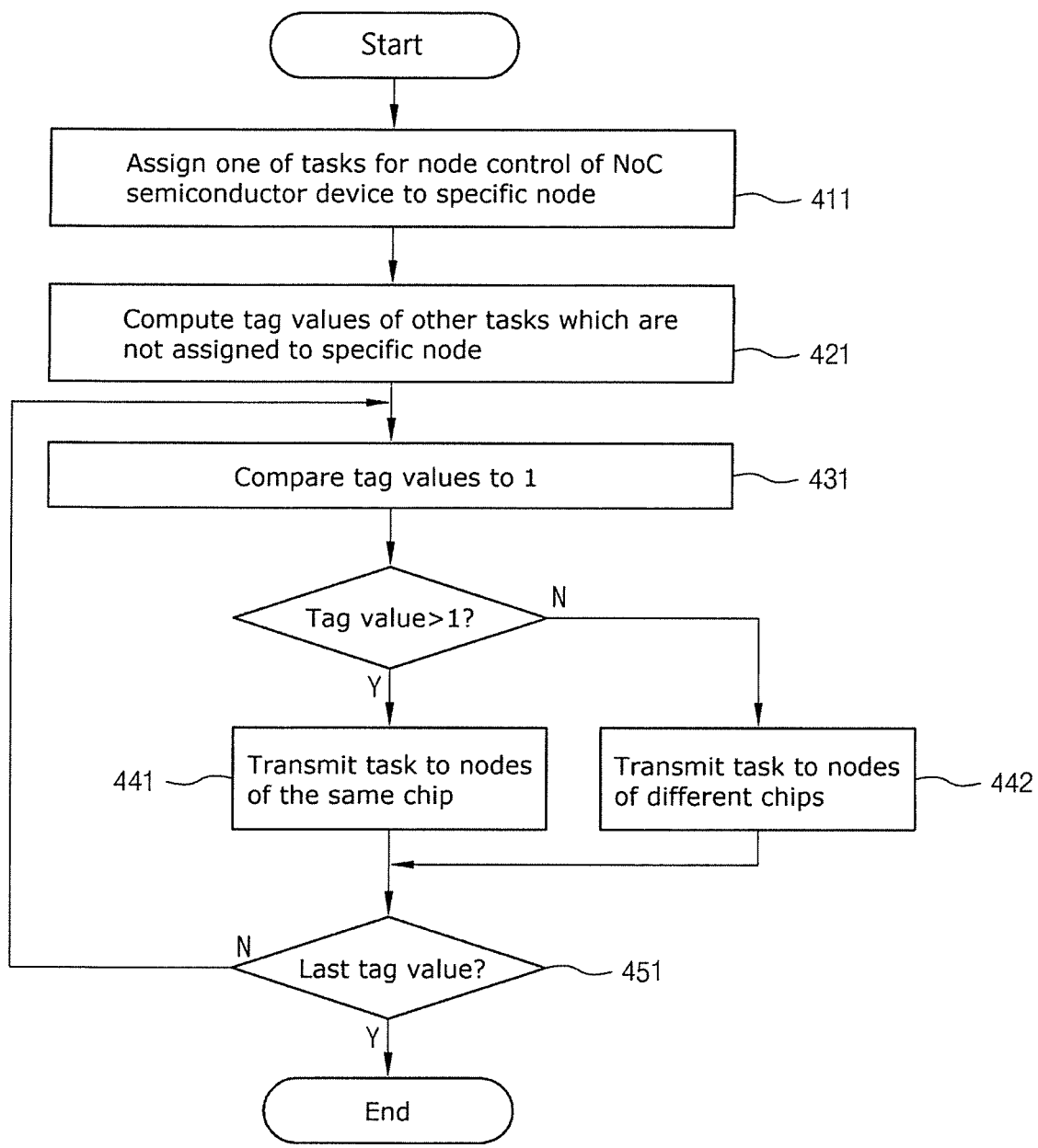
FIG. 4 is a flowchart illustrating a task mapping method of a NoC semiconductor device in accordance with an embodiment.

FIG. 4 is a flowchart illustrating a task mapping method of the NoC semiconductor device 101 in accordance with an embodiment. Referring to FIG. 4, the task mapping method may include first to fourth steps 411 to 442. The task mapping method will be described with reference to FIGS. 1 to 4.

At the first step 411, one of a plurality of tasks for node control of the NoC semiconductor device 101 may be assigned to a specific node. The first step 411 may include arranging the tasks in a line, and selecting a first one of the plural tasks in the line and assigning the selected first task to the specific node.

Specifically, the plurality of tasks may be arranged in parallel. For example, the tasks may be arranged in a line. In addition, the tasks may be arranged in various manners.

Figure 5:
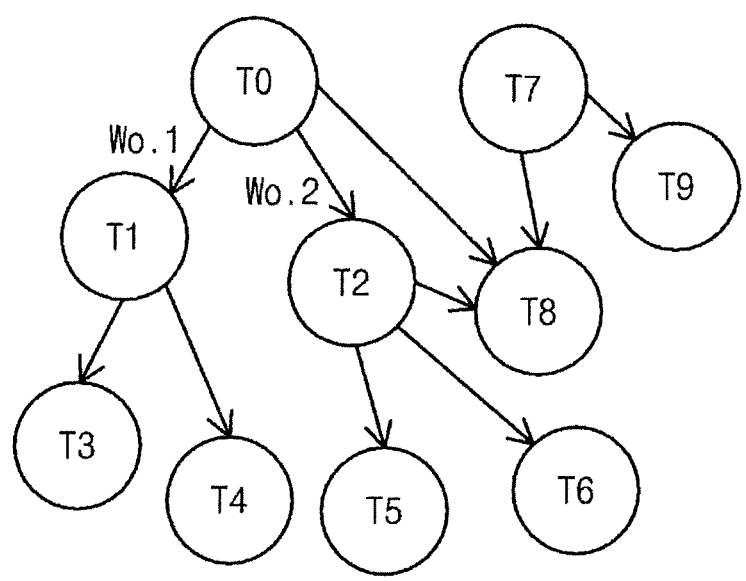
FIG. 5 is a graph illustrating a task characteristic.

In order to efficiently arrange the tasks, communication patterns and communication characteristics among the respective tasks need to be considered. FIG. 5 is a graph illustrating the task characteristics. Referring to FIG. 5, a task characteristic graph G may be expressed as "G=<T, W>" where $t_i$ ($t_i \in T$) represents a task, and $w_{ij}$ ($w_{ij} \in W$) represents a communication through which data is transmitted to a task $t_j$ from a task $t_i$.

Each task $t_i$ may include four tuples (ti=<$id_i, e_i, d_i, r_i$>) where $id_i$ represents a task identifier, $e_i$ represents a task execution time or computation requirement, $d_i$ represents the deadline of the task $t_i$, and $r_i$ represents a sub task list related to the task $t_i$. Three tuples $e_i$, $d_i$, and $r_i$ may be defined by an application to be executed.

A 3D mesh-type NoC may be used as a network of the 3D NoC semiconductor device 101. At this time, the arrangement states and connection states of the nodes 112, 122, and 132 included in the 3D NoC semiconductor device 101 may be defined in consideration of the communication patterns and characteristics among the tasks. A graph T for expressing the topology of the NoC semiconductor device 101 illustrated in FIGS. 1 and 2 may be represented as T=<P, L>, where $P_{i,j,k}$ ($P_{i,j,k} \in P$) represents a node with a location represented as x, y, and z coordinates of the node in the 3D NoC semiconductor device 101, and (lv,lh) {(lv,lh)∈L} represents a link between horizontal and vertical communications as well as a bandwidth of the link.

A mapping function expressed by the following equation may be applied to all nodes (P={$p_{0,0,0}$, ..., $P_{i,j,k}$}) for all tasks ((T={t1,t2, ... tn}) existing in the application of the node:

$$\text{map}(t_m) = P_{i,j,k}, \forall tm \in T, \exists P_{i,j,k} \in P.$$

When T(n)≤P(n), mapping is defined.

At the second step 421, tag values of the other tasks which are not assigned to the specific node may be computed. The tag values $Tag_i$ can be computed through the following equation:

$$Tag_i = \frac{\alpha \times e_i \sum\limits_{\forall task} e_i}{(1-\alpha) \times \sum\limits_{\forall r_i} w_{i,j} / \sum\limits_{\forall task} w_{i,j}} (0 < \alpha < 1)$$

where α represents a reference value, $e_i$ represents a task execution time or computation requirement, $r_i$ represents a sub task list related to a task characteristic, $w_{ij}$ represents the average communications through which data is transmitted from an i-th task to a j-th task. The reference value α is defined in consideration of the identifiers $id_i$ of the entire tasks within the application.

The computed tag value may be used to determine which one of computation and communication a task belonging to the application of the node is biased to. Under consideration that a tag value can be biased to one of computation and communication, the tag value may be defined by selecting the reference value α which guarantees uniform distribution of mapping directions with reference to the dead line $d_i$ of each task and the average of communications $K_{ij}$ between tasks.

In the case of a task biased to communication between sub tasks, the task mapping may be vertically performed to increase communication efficiency through TSVs. On the other hand, in the case of a task biased to computation, the task mapping may be horizontally performed in consideration of power density, thereby equalizing heat emissions.

At the third step 431 to 442, the other tasks may be assigned to other nodes according to the tag values.

Specifically, the third step 431 to 442 may include comparing the tag values with a threshold value '1' at step 431, assigning tasks having the tag values to the nodes of the same chip when the tag values are larger than '1' at step 441, and assigning the tasks having the tag values to the nodes of different chips when the tag values are equal to or less than '1' at step 442.

Specifically, the tag values may be compared to the threshold value '1'. As a result, when a tag value is larger than 1, a task corresponding to the tag value is transmitted to another node within the same semiconductor chip of the specific node. When the tag value is equal to or less than 1, a task corresponding to the tag value is transmitted to a node of a semiconductor chip that is different from the semiconductor chip of the specific node.

Then, the NoC semiconductor device may check whether the compared tag value is the last tag value, at step 451. When the tag value is the last tag value, the task mapping method may end. Otherwise, the process following step 431 may be repeated until the tag value becomes the last tag value.

As described above, the task mapping method in accordance with the present embodiment may reduce not only the complexity of the static task mapping method, but also the frequency of hot spots in the dynamic task mapping method. In accordance with the present embodiment, the computation time required for heat control, which is proportional to the average number of tasks, is reduced even though the number of tasks is increased.

Figure 6:
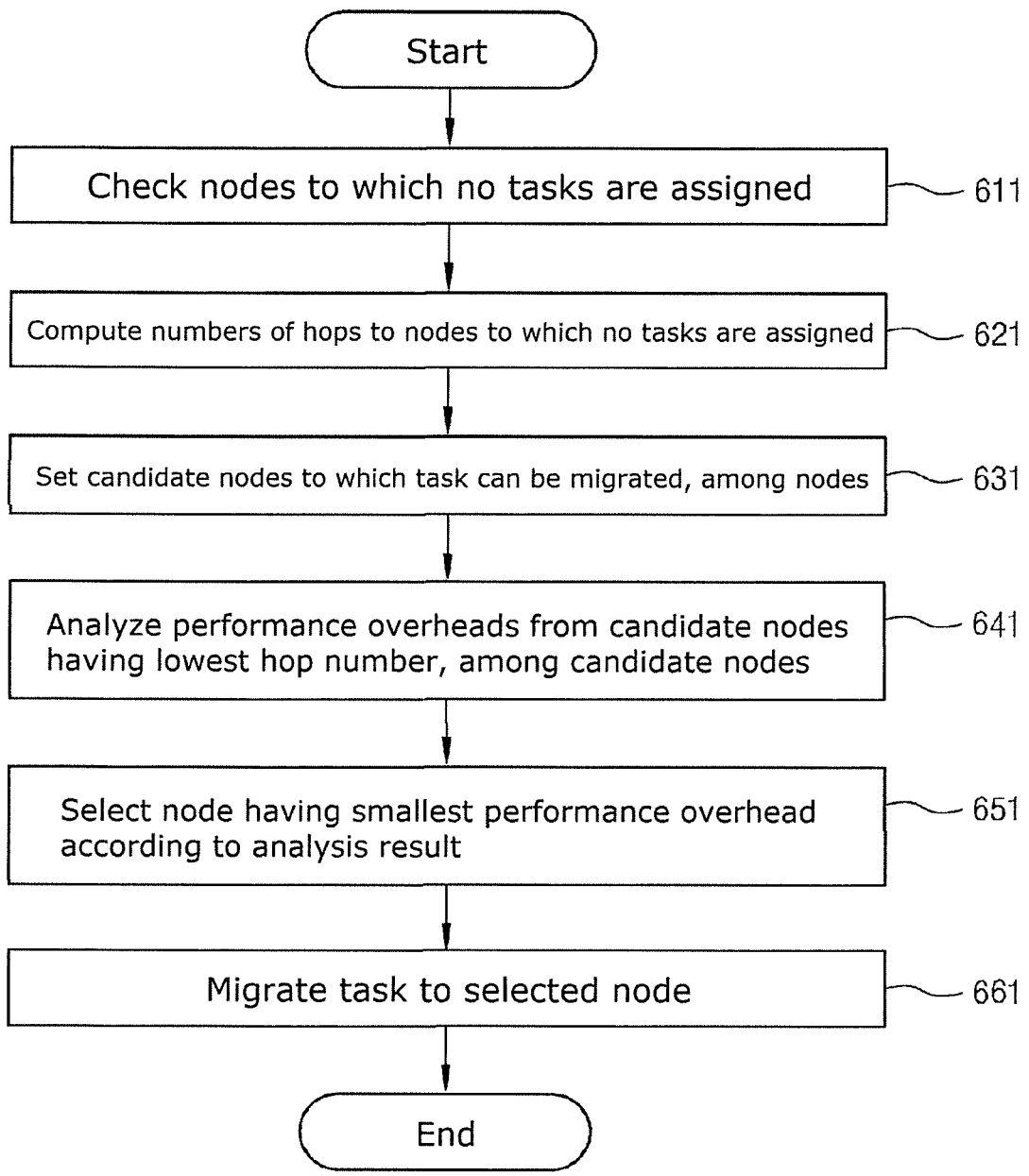
FIG. 6 is a flowchart illustrating a task mapping method of a NoC semiconductor device in accordance with another embodiment.
Figure 7:
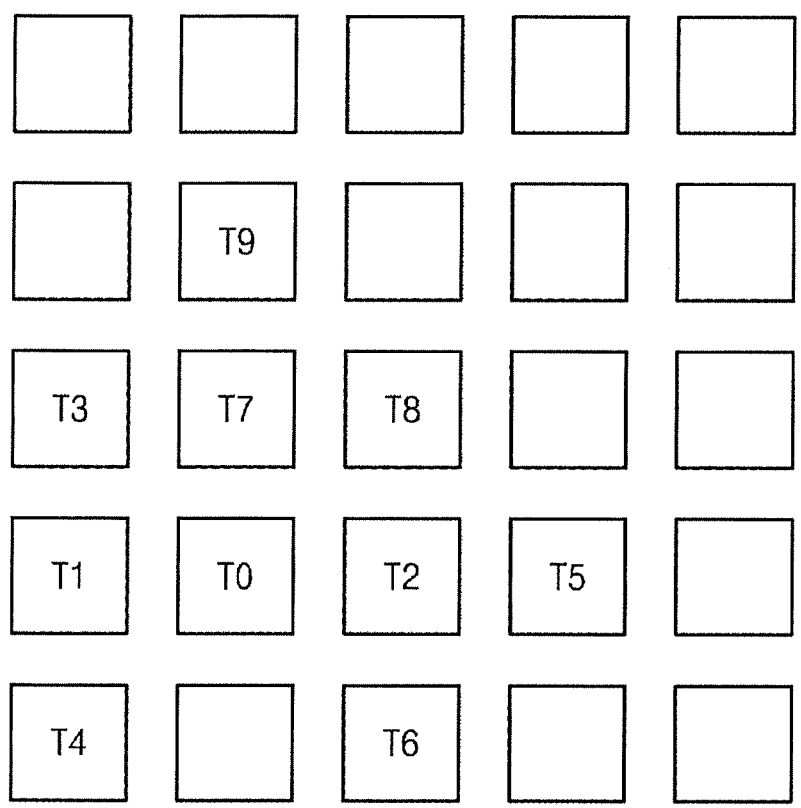
FIGS. 7 to 10 are state diagrams of nodes which are illustrated in a 2D manner in order to describe the task mapping method illustrated in FIG. 6.
Figure 8:
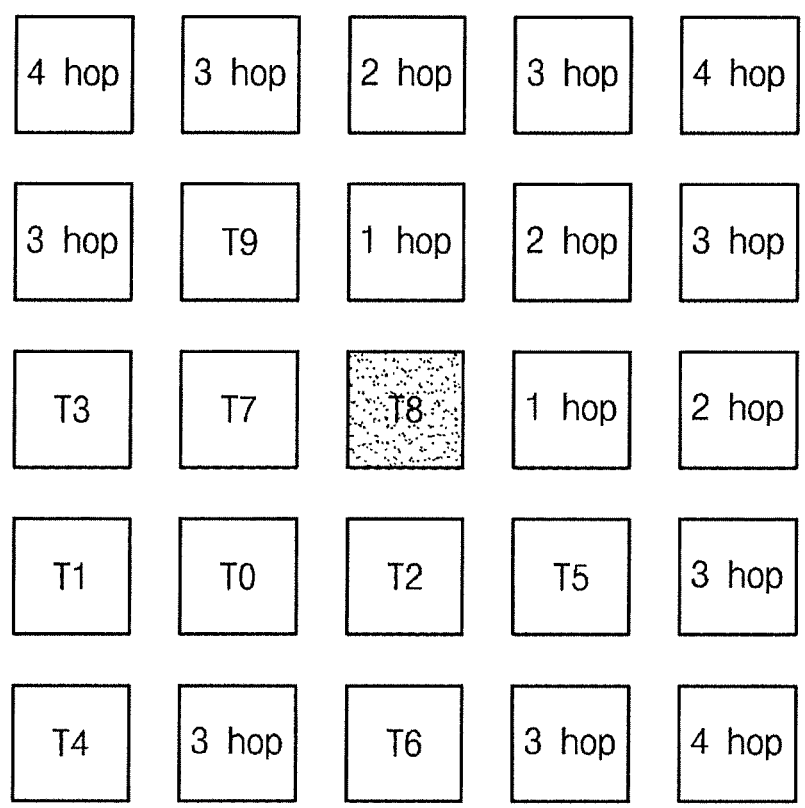

FIG. 6 is a flowchart illustrating a task mapping method of the NoC semiconductor device 101 in accordance with another embodiment. FIGS. 7 and 8 are state diagrams of nodes which are illustrated in the 2D manner in order to describe the task mapping method illustrated in FIG. 6. Referring to FIG. 6, the task mapping method may include first to sixth steps 611 to 661. The task mapping method will be described with reference to FIGS. 1 to 3 and 6 to 10.

At the first step 611, the NoC semiconductor device may check the nodes to which no tasks are assigned. FIG. 7 illustrates that tasks T0 to T9 are assigned to 10 nodes among the nodes arranged in a 5×5 matrix form, and no tasks are assigned to the other nodes. Thus, the tasks T0 to T9 may be migrated to the other nodes.

At the second step 621, the NoC semiconductor device may compute the number of hops to the nodes to which no tasks are assigned. Referring to FIG. 8, the NoC semiconductor device may compute the number of hops to the nodes to which no tasks are assigned from the node of task T8 at which a heat problem occurred. The number of hops may be the number of nodes on the shortest vertical and horizontal path from a source node to a target node for the task to be migrated. In FIG. 8, the number of hops to the remotest nodes from the node of the task T8 is four hops.

At the third step 631, the NoC semiconductor device may set candidate nodes among the nodes to which the task can be migrated. That is, the NoC semiconductor device may set the candidate nodes to which the task of the node of the heat problem can be migrated.

Specifically, when a heat problem such as a hot spot occurs at a specific node (for example, the task T8 of FIG. 8), the task of the node needs to be migrated to another node in which no heat problem occurs. For this operation, the NoC semiconductor device may set a candidate group, that is, the candidate nodes, in order to select a node to which the task can be migrated.

In order to set the candidate nodes, the NoC semiconductor device may refer to a lookup table which stores node information. The lookup table may include the temperature at the task computation start point of each node and a remaining computation time $e_i'$ that is taken until the temperature reaches a thermal threshold $T_{th}$.

The NoC semiconductor device may generate a lookup table by measuring the temperature of the NoC semiconductor device at each predetermined period at the same time as the task mapping in FIG. 4.

As a temperature equation used for the lookup table, the temperature $Th_{i,j,k}$ of each node $P_{i,j,s}$ is defined in the following equation:

$$Th_{i,j,k} = T_{amb} + \sum_{m=1}^{k} \frac{R_{i,j,k}}{A} \left( \sum_{s=m}^{n} (P_{i,j,s} + PR_{i,j,s}) \right)$$

where $T_{amb}$ represents the ambient temperature, m represents the number of layers in each of chips included in the NoC semiconductor device, $R_{i,j,k}$ represents a thermal resistance proportional constant of each node, A represents the area of each node, and represent power consumption based on task computation at a node of a position (i,j,s) and power consumption of the router per bit.

When a heat problem occurs in the specific node and the task of the specific node needs to be migrated to another node, an operation to be preferentially performed is to prevent a heat problem in a node to which the task is to be migrated. That is because, when a task is repetitively migrated, the performance is inevitably reduced. For this operation, the NoC semiconductor device may select the candidate node to which the task may be migrated on the basis of an initial temperature value and the remaining computation time which are obtained from the lookup table. The NoC semiconductor device may set the candidate nodes using the following equation, and a node $P_{q,r,s}$ having a value of 1 in the following equation may be set to the candidate node in which no heat problem is to occur:

$$P_{q,r,s} = \begin{cases} 1 & \text{if } Th_{q,r,s} + \dfrac{T_{th} - Th_{i,j,k}}{e_i - e'_i} \times e'_i \leq T_{th} \\ 1 & \text{if } Th_{q,r,s} + \dfrac{T_{th} - Th_{i,j,k}}{e_i - e'_i} \times e'_i \geq T_{th} \end{cases}.$$

Figure 9:
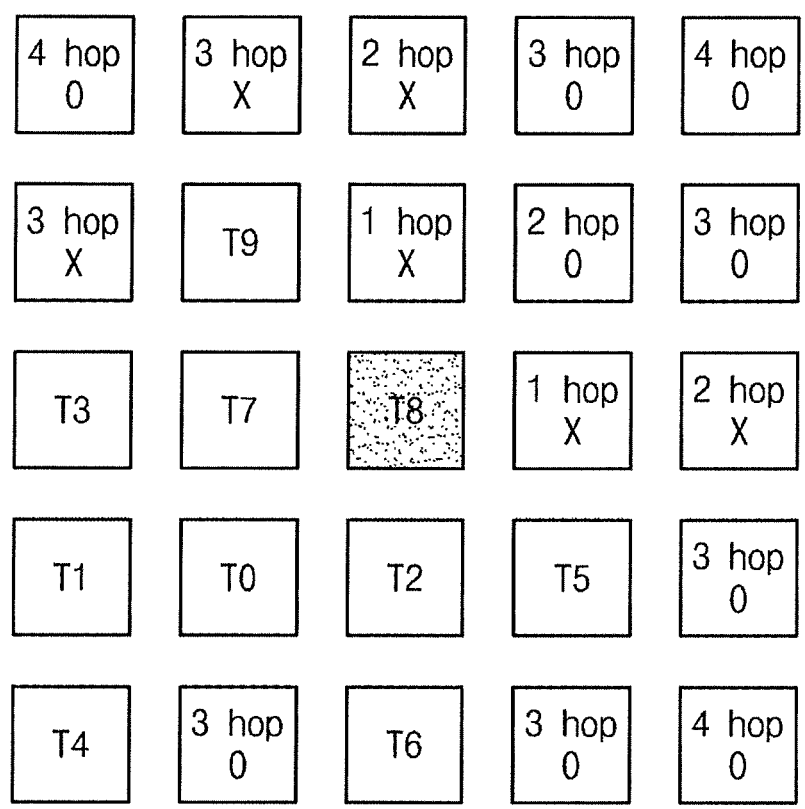

Referring to FIG. 9, the nodes having two to four hops may be set to the candidate nodes. In FIG. 9, a node denoted by "o" is the candidate node, and a node denoted by "x" is not the candidate node. Specifically, the candidate nodes may include one node having two hops, five nodes having three hops, and three nodes having four hops.

At the fourth step 641, the NoC semiconductor device may analyze a performance overhead from the candidate nodes having the lowest hop number among the candidate nodes. The NoC semiconductor device may analyze the performance overhead while increasing the hop number one by one. When the performance overhead is degraded as the hop number is increased, the NoC semiconductor device may stop analyzing the performance overhead for the nodes having high hop numbers.

Figure 10:
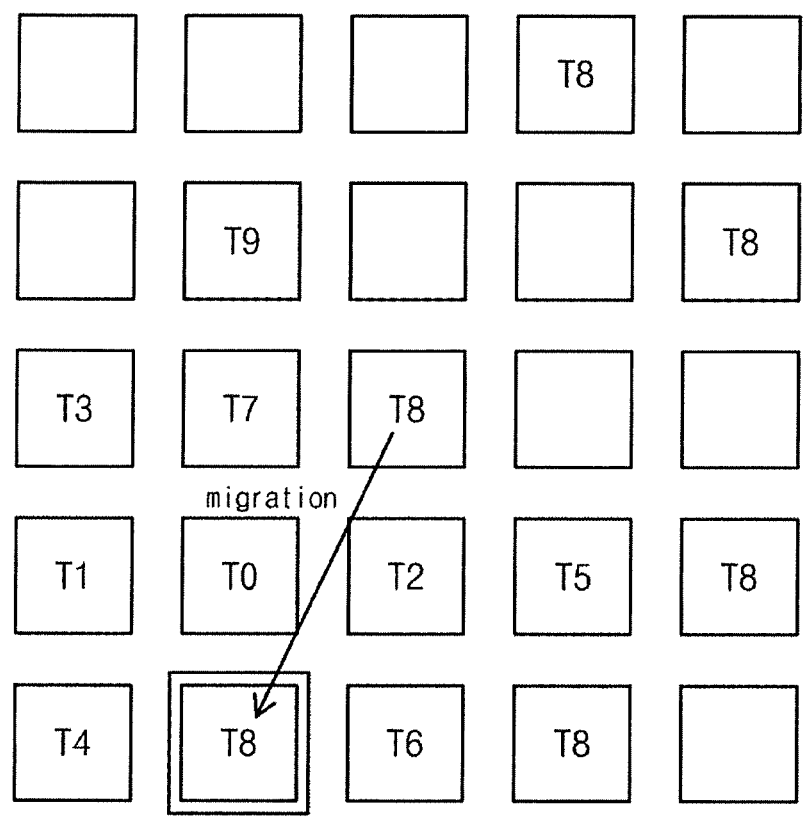

At the fifth step 651, the NoC semiconductor device may select the node having the smallest performance overhead according to the analysis result for the performance overhead. Referring to FIG. 10, the node positioned at the second column from the left and the fifth row from the top may be selected as the node having the smallest performance overhead.

Since the performance overheads of the nodes having four hops are not increased more than the performance overheads of the nodes having three hops, the performance overheads for the nodes having four hops or more may not be analyzed. That is, when the performance overheads of the nodes having four hops are worse than the performance overheads of the nodes having three hops, it indicates that the performance overhead of the nodes having more than four hops is degraded as the number of hops increases.

At the sixth step 661, the task T8 of the node in which the heat problem occurred is migrated to the selected node.

In the case of the selected node, a delay corresponding to one hop occurs, compared to the case in which a general node is selected. However, communications and energy consumption between tasks are reduced more than the general case.

Whenever a heat problem such as a hot spot occurs, the task mapping method for the node is repeated.

In accordance with the present embodiments, although the number of tasks increases, it is possible to reduce the computation time required for heat control, which is proportional to the average task number.

Furthermore, it is possible to reduce the communication and energy consumption between tasks.

Although various embodiments have been described for illustrative purposes, it will be apparent to those skilled in the art that various changes and modifications may be made without departing from the spirit and scope of the invention as defined in the following claims.

What is claimed is:

1. A task mapping method of a network-on-chip (NoC) semiconductor device, which migrates a task of a first node among multiple nodes, the method comprising:
   checking second nodes to which no tasks are assigned;
   computing the number of hops from the first node to the second nodes;
   setting candidate nodes to which the task can be migrated, among the second nodes;
   analyzing performance overheads of the candidate nodes in ascending order with respect to the number of hops;
   selecting a target node having the smallest performance overhead according to the analysis result; and
   migrating the task to the target node.

2. The task mapping method of claim 1, wherein when the performance overhead is degraded as the number of hops is increased, the performance overhead analysis is stopped.

3. The task mapping method of claim 1, wherein the setting the candidate nodes includes referring to a lookup table in which data on the first and second nodes are stored.

4. The task mapping method of claim 3, wherein the lookup table comprises temperature at the task computation start point of each node and a remaining time that is taken until the temperature reaches a thermal threshold.

5. The task mapping method of claim 1, wherein the analyzing of the performance overheads are performed while the number of hops is increased one by one.

\* \* \* \* \*